J. SIMRALL.
CULTIVATOR.
APPLICATION FILED OCT. 12, 1917.
1,288,241.
Patented Dec. 17, 1918.
2 SHEETS—SHEET 1.
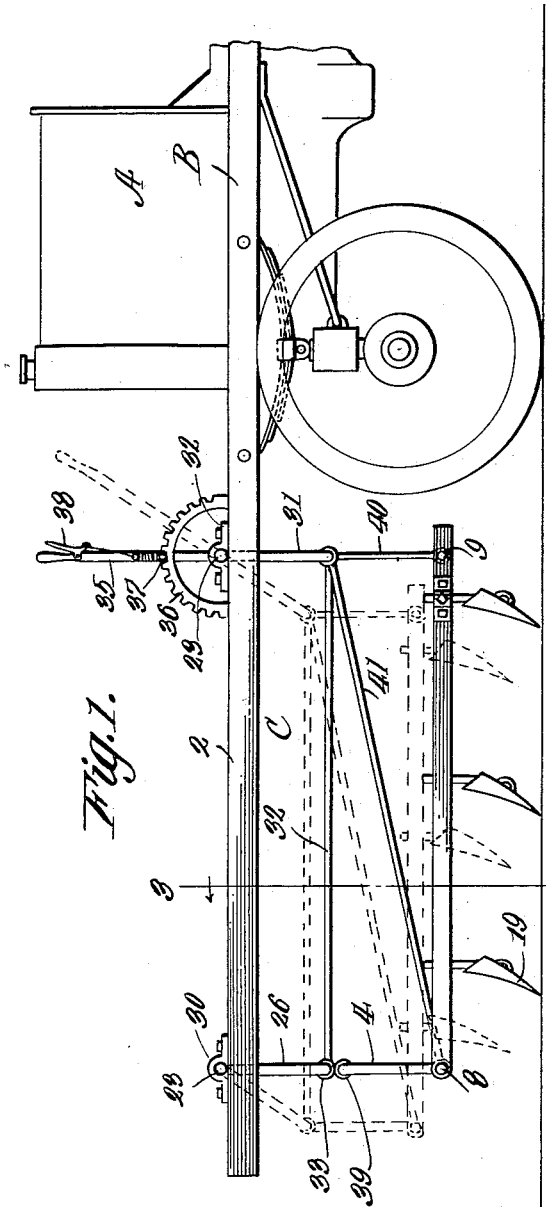
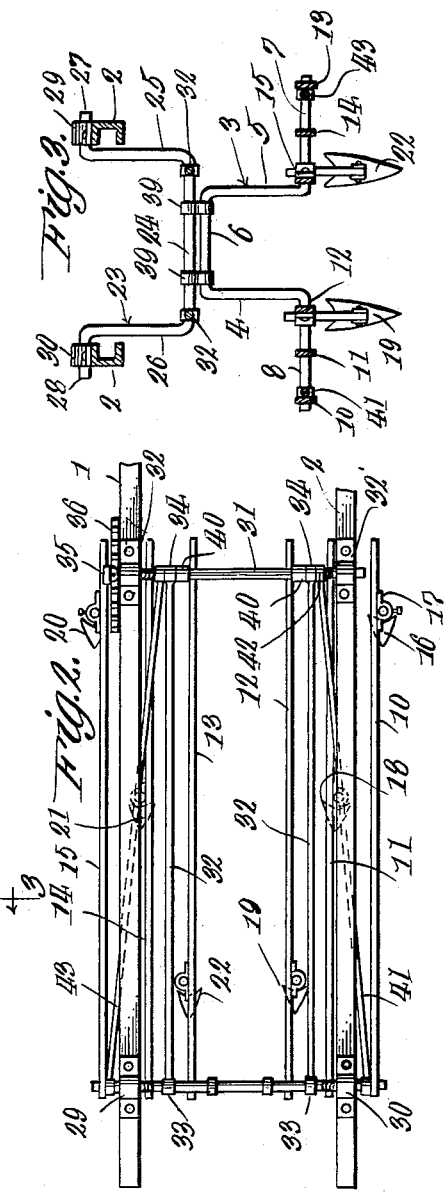
INVENTOR
James Simrall
WITNESSES.
ATTORTEY J. SIMRALL.
CULTIVATOR.
APPLICATION FILED OCT. 12, 1917.
1,288,241.
Patented Dec. 17, 1918.
2 SHEETS—SHEET 2.
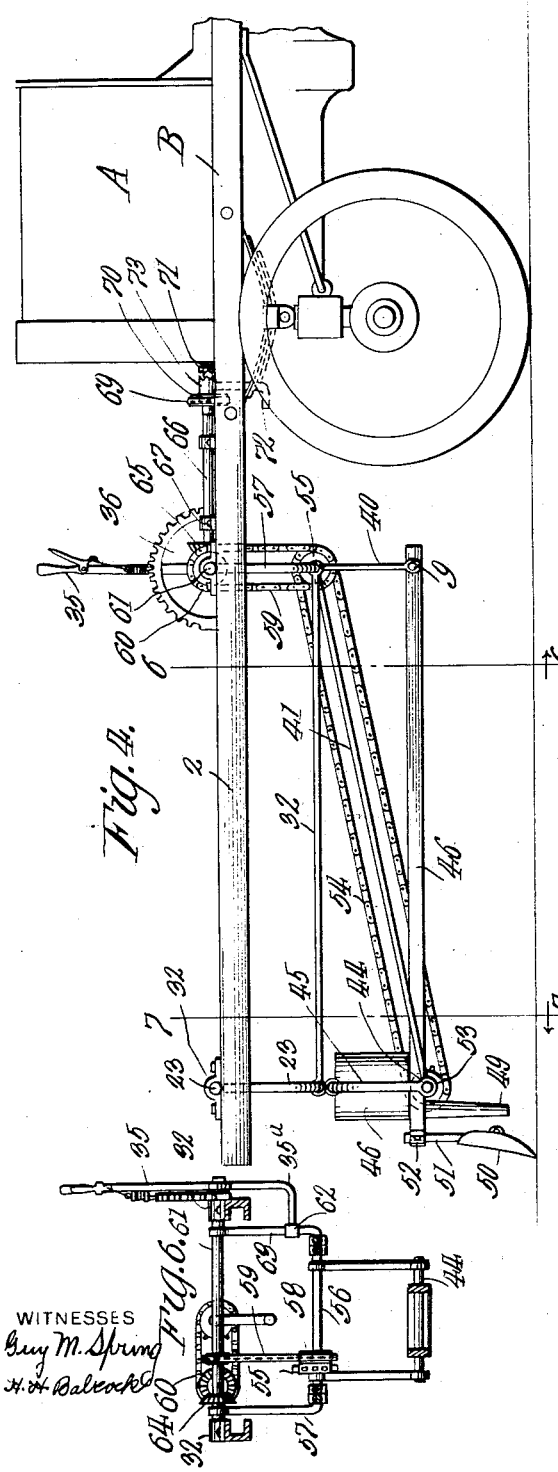
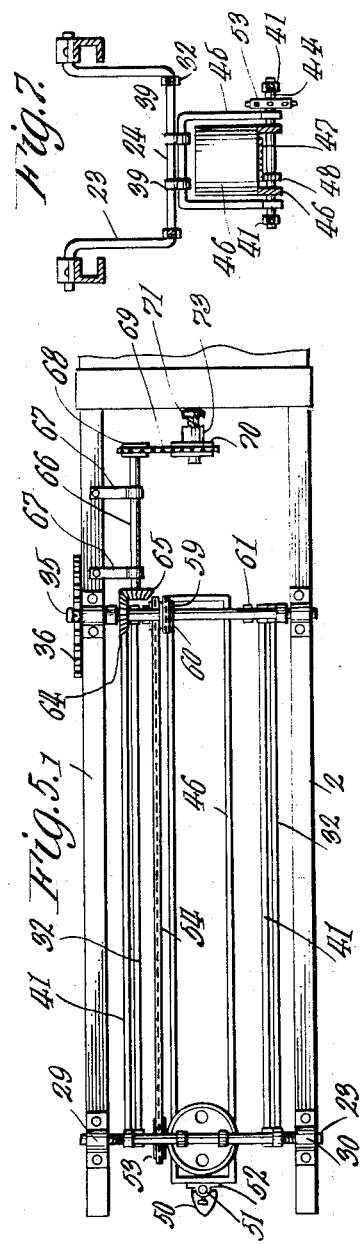
INVENTOR
James Simrall
WITNESSES
Guy M. Spring
H. H. Balcock
ATTORNEY

UNITED STATES PATENT OFFICE.

JAMES SIMRALL, OF GLASS, MISSISSIPPI.

CULTIVATOR.

1,288,241.   Specification of Letters Patent.   Patented Dec. 17, 1918.

Application filed October 12, 1917. Serial No. 196,243.

*To all whom it may concern:*

Be it known that I, JAMES SIMRALL, a citizen of the United States, residing at Glass, in the county of Warren and State of Mississippi, have invented certain new and useful Improvements in Cultivators, of which the following is a specification.

This invention relates to cultivators, and more particularly to a cultivator of the tractor type.

One of the main objects of the invention is to provide a tractor the frame of which is so constructed as to support a cultivating or planting means in front of the tractor. A further object is to provide means for supporting a cultivating planting device on the tractor frame so as to be at all times in proper operative position. A further object is to provide simple and efficient means for moving the cultivator planting means in and out of operative position. Further objects will appear from the detailed description.

In the drawings:

Figure 1 is a fragmentary side view of a tractor constructed in accordance with my invention with a cultivating means mounted thereon.

Fig. 2 is a top plan view of the same, the tractor being omitted.

Fig. 3 is a section on line 3—3 of Fig. 1.

Fig. 4 is a view similar to Fig. 1 with a planting device substituted for the cultivator.

Fig. 5 is a top plan view of the same.

Fig. 6 is a section on line 6—6 of Fig. 4.

Fig. 7 is a section on line 7—7 of Fig. 4.

A designates an automobile tractor of standard construction. The side beams or bars B of the frame of this tractor are extended so as to project forwardly of the same, providing the spaced parallel supporting beams 1 and 2. These beams extend a sufficient distance in front of the tractor to support a cultivator designated generally by C. A crank shaft 3 having the vertical arms 4 and 5, horizontal top bar 6, and laterally extending horizontal arms 7 and 8, is provided at the forward end of the cultivator. A transverse rod 9 is provided at the rearward end of the cultivator. Three parallel bars 10, 11, and 12 are secured, at their front ends, to the horizontal arm 8 of axle 3. These bars extend rearwardly of the cultivator in parallel spaced relation and are secured, adjacent their rear ends, on the rod 9. Three bars 13, 14, and 15 are similarly secured to the horizontal arm 7 of axle 3 and the rod 9. These two sets of bars, together with the axle 3 and rod 9 constitute the body of the cultivator. A cultivator point or shovel 16 is secured to bar 10 a short distance from the rear end thereof, by means of a suitable securing strap 17. A similar point 18 is similarly secured to the central bar 11 in advance of point 16, and a third point 19 is secured to the innermost bar 12 in advance of point 18. Three points or shovels 20, 21, and 22, are similarly secured to the bars 13, 14, and 15, respectively. The points, thus arranged, form two converging series of ground working elements which are so positioned as to travel one behind the other at each side of a row of plants thus loosening and working the ground at the sides of the row in the well known manner. This cultivator is well adapted for use in connection with the supporting beams 1 and 2 of the tractor, and is so constructed as to be readily mounted upon these beams.

A U-shaped shaft 23 is rockably mounted on the supporting beams 1 and 2 adjacent the forward end thereof. This shaft is provided with the lower horizontal bar 24, the vertical arms 25 and 26 integral therewith which are turned outward at right angles at their upper ends to provide the trunnions 27 and 28, respectively, which are mounted in the bearing blocks or straps 29 and 30, respectively, secured to the beams 2 and 1. A shaft 31 similar to shaft 29 is rockably supported in bearing straps 32 secured to the beams 1 and 2 adjacent the inner ends thereof, *i. e.* adjacent the front of the tractor A. The horizontal bar 24 of shaft 23 is connected to the horizontal bar of shaft 31 by means of the connecting rods 32 which are loosely connected at their forward ends, by means of integral eyes 33, to the horizontal bars 24 adjacent each end thereof, the inner or rearward ends of the connecting bars being loosely connected to the horizontal bar of shaft 31 by the eyes 34. By this construction, if either shaft 23 or 31 is rocked, it is evident that similar and equal movement will be imparted to the other shaft through the connecting rods 32.

A hand lever 35 is secured to one end of crank shaft 23 adjacent one of the bearing straps 32. A quadrant 36 is secured to supporting beam 1 intermediate this hand lever and the bearing strap. This quadrant cooperates with a spring pressed detent 37 mounted on the lever and controlled by a hand latch 38 for securing the lever in rocked adjustment. By this means, the shafts 23 and 31 may be simultaneously and similarly rocked so as to raise or lower the same, and may be easily secured in rocked adjustment.

The horizontal top bar 6 of the front cranked axle 3 of the harrow is loosely connected by means of the hangers 39 to the horizontal lower bar 24 of shaft 23. The back rod 9 of the cultivator is loosely connected by the spaced links 40 to the lower horizontal bar of shaft 23. An inclined brace rod 41 is provided at one side of the cultivator, and is loosely secured at its forward end to the lower horizontal arm 7 of the crank axle 3 adjacent the outer bar 13. The upper end of this bar is loosely secured to the horizontal bar of the rear crank shaft 31, as at 42. A similar inclined brace rod 43 is similarly secured at its forward end to the horizontal arm 8 of axle 3 adjacent bar 10 and, at its upper end, to the lower horizontal bar of shaft 31. By this means, the cultivator 6 is suspended from the shafts 23 and 31 so as to be raised or lowered in accordance with the movement of these shafts. In addition, the brace rods 41 and 43, hangers 39, and links 40, insure that the cultivator will be at all times maintained in substantially horizontal position. By rocking shafts 31 and 23 into their lowermost position, the cultivator C will be lowered so as to bring the cultivator shovels into operative engagement with the ground surface. The cultivator is secured in this position by locking the lever 35 in vertical position, as in Fig. 1 of the drawings. When the adjusting lever is thus locked, the crank shafts 31 and 23 are secured against movement so that the cultivator frame or body is held rigidly in proper operative position by the connecting rod 32 and brace rods 41 and 43. By swinging the hand lever 35 rearwardly, the cultivator may be easily raised into inoperative position, in which position it will be rigidly secured by means of the hand lever, as indicated in Fig. 1, thus permitting the cultivator to be readily transported from place to place.

In Figs. 4 to 7 inclusive I have shown a planting means substituted for the cultivating means. A transverse rod 44 is suspended from the horizontal arm 24 of the crank shaft 23 by means of a U-member 45 which is loosely secured to bar 24 by the hangers 39. A rectangular frame 46 is supported at its forward end by rods 44, and at its rearward end by rod 9. The seed can or hopper 46 is secured on frame 46 adjacent the forward end thereof above the shaft 44 which is rotatable in the side bars of the frame. This seed hopper may be of any standard construction, being provided with the usual seeding mechanism operated by a gear-ring 47 mounted on the bottom of the can or hopper with which meshes a beveled pinion 48 secured on shaft 44. The seed are discharged through a chute 49 positioned in rear of a furrow opener or shovel 50 secured to the front of the frame 46 by means of a standard 51 and securing member 52. The frame 46 may be readily raised and lowered, and secured in adjustment by means of the hand lever 35 in the same manner as the harrow C is adjusted.

A sprocket wheel 53 is secured on the rotatable shaft 44. This sprocket wheel is operatively connected by a chain 54 to a sprocket wheel 55 rotatably mounted on the lower horizontal bar 56 of a U-hanger 57 corresponding to the rear crank axle 31. The sprocket wheel 55 is secured to a sprocket wheel 58 which is also rotatable on bar 56, the latter sprocket wheel being connected by a chain 59 to a sprocket wheel 60 secured on a transverse shaft 61 rotatably mounted in the bar bearing straps 32, the U-hanger 57 being rockably suspended from this shaft. In this construction the hand lever 35 is extended to provide an integral rectangular or L-shaped arm 35$^a$ provided at its inner end with a ring or eye 62 which fits about the vertical arm 63 of member 57. By this construction, the U-hanger 57 and the forward crank shaft 23 may be readily adjusted by means of the hand lever 35 so as to raise or lower the planting mechanism. As the axis about which member 57 is adjusted is co-incident with the axis of shaft 61 which drives the sprocket 60, the driving connections for the shaft 44 will not be in any way affected by the raising or lowering of the planting mechanism.

A bevel gear 64 is secured on shaft 61 to one side of sprocket 60. This bevel gear meshes with a bevel gear 65 secured on the forward end of a counter-shaft 66 rotatably supported by brackets 67 projecting inwardly from supporting beams 1. A sprocket wheel 68 is secured on the inner end of counter shaft 66 and is connected by a chain 69 to a sprocket wheel 70 secured on the crank shaft 71 of the engine or motor of the tractor A. The sprocket wheel 70 is positioned in front of the crank 72 which is provided with a sleeve 73 fitting loosely about crank shaft 71, this sleeve being provided with the usual clutch element coöperating with the clutch element mounted on shaft 71. By this construction, the automobile motor may be cranked or started in the usual manner, after which the shaft 71 will rotate freely in sleeve 73 so as to drive the planting mechanism from the engine or the motor of the tractor A. By this construction I have provided a simple and efficient planting mechanism which is supported directly by the automobile or tractor frame, and which is driven from the motor of the tractor. This planting mechanism may be quickly and easily adjusted in the same manner as the cultivator previously described so as to be readily moved into either operative or inoperative position.

While I have described but a one row cultivator, it will be evident that, by increasing the length of the shafts 23 and 21 and providing a suitable crank portion at each end of the same, I can readily mount a single row cultivator at each side of the supporting beams, thus producing a two row cultivator. I can also, by a similar variation of the seeding apparatus shown and described produce a two row seeder. It is thought that these variations for converting the one row cultivator or one row seeder into a two row apparatus will be readily apparent and need not be further described or illustrated.

It will be evident that there may be slight changes made in the construction and arrangement of the various parts of my invention, and I intend to include all such variations, as fall within the scope of the appended claims, in this application in which a preferred form only of my invention is disclosed.

I claim:

1. In an agricultural machine, the combination with supporting beams, of two spaced crank shafts rockably mounted on said beams, a harrow suspended from said shafts, connecting rods connected at their ends to the crank shafts, inclined brace rods connected at their forward ends to the forward end of the harrow and at their rearward ends to the rearward crank shaft, and means for rocking the said rearward crank shaft and for securing the same in rocked adjustment.

2. In an agricultural machine, the combination with supporting beams, of two longitudinally spaced crank shafts rockably mounted on said beams, rods connecting the crank shafts, a crank shaft suspended from the forward longitudinally spaced crank shaft, links suspended from the rearward longitudinally spaced crank shaft, a transverse rod carried by the links, longitudinally extending bars carried by the transverse rod and the lower forward crank shaft, ground treating implements carried by the longitudinal bars, and means for rocking the crank shafts and securing them in rocked adjustment.

In testimony whereof I affix my signature in presence of two witnesses.

JAMES SIMRALL.

Witnesses:
R. A. GEURY,
P. W. FLANAGAN.